United States Patent

Rannikko et al.

[11] Patent Number: 5,760,404
[45] Date of Patent: Jun. 2, 1998

[54] METHOD AND AN APPARATUS FOR DETERMINING THE FIELD SIZE AND THE FIELD FORM OF THE RADIATION CONE OF IONIZING RADIATION SOURCE

[76] Inventors: Simo Rannikko, Jokitie, 1, FIN-00780, Helsinki; Kari Helenius, Seilikuja 8, FIN-02180, Espoo, both of Finland

[21] Appl. No.: 666,576
[22] PCT Filed: Dec. 31, 1993
[86] PCT No.: PCT/FI93/00577
§ 371 Date: Nov. 19, 1996
§ 102(e) Date: Nov. 19, 1996
[87] PCT Pub. No.: WO95/18391
PCT Pub. Date: Jul. 6, 1995
[51] Int. Cl.[6] .................................................. G01T 1/105
[52] U.S. Cl. ................................. 250/374; 250/385.1
[58] Field of Search .......................... 250/374, 385.1

[56] References Cited

U.S. PATENT DOCUMENTS

| | | | |
|---|---|---|---|
| 3,942,012 | 3/1976 | Boux | 250/385.1 |
| 4,206,355 | 6/1980 | Boux | 250/374 |
| 5,396,889 | 3/1995 | Ueda et al. | 378/148 |

*Primary Examiner*—Don Wong
*Attorney, Agent, or Firm*—Kubovcik & Kubovcik

[57] ABSTRACT

The object of the invention is a method for determining the size and shape of the radiation field (11) of an X-ray machine automatically by means of a multielectrode ionization chamber (5). By means of the method relating to the invention both the dose and the size and shape of the radiation field can be measured separately so that the ratios of the currents of the electrodes (2, 3) located in different directions in the ionization chamber (5) to the current of the reference electrode (1) provide information on the size and shape of the field, and the sum of the currents is proportional to the dose.

10 Claims, 4 Drawing Sheets

METHOD AND AN APPARATUS FOR DETERMINING THE FIELD SIZE AND THE FIELD FORM OF THE RADIATION CONE OF IONIZING RADIATION SOURCE

The object of the invention is a method for determining the size and shape of the field of a radiation beam of an ionizing radiation source by means of an ionization chamber.

In recent years, increasing attention has been paid to the X-radiation doses patients are subjected to in connection with both X-ray diagnostics and the use of treatment equipment. Automatic recording of radiation doses significantly increases the possibilities for comparing X-ray examinations, thus facilitating the development of X-ray examinations which reduce the radiation stress on the patient without, however, diminishing the diagnostic value of the examinations.

At present, the radiation dose the patient is subjected to is measured by means of a so-called area-dosimeter which consists of a flat, bielectrode ionization chamber and an electronic measuring part relating to it. This equipment gives a reading essentially proportional to the product of field size and radiation, but the field size itself cannot be separately determined. The size and shape of the radiation field are, however, extremely significant, especially in determining the predisposition of the patient's different organs to radiation.

The aim of the present invention is to determine the size and shape of the X-radiation field in a new way. It is characteristic of the method relating to the invention that the field to be measured is divided into at least two separate electrode areas, so that the first area, or the reference electrode area, is located mainly in the centre part of the radiation field being measured, that the edge of the radiation area is set so as to pass through the second area, or the electrode area measuring the size and shape of the field, and that the shape of the field is determined by comparing the current of the first electrode area with the current of the second electrode area.

By means of the method relating to the invention, the size of the useful beam of the radiation transmitted from the X-ray tube and limited with screens can be determined by measuring separately the currents of different electrodes in a multi-electrode ionization chamber. By calculating the proportions of the currents, the size of the field in different directions can be determined.

The object of the invention also comprises a device for determining the size and shape of the field of a radiation beam of an ionizing radiation source by means of an ionization chamber. At is characteristic of the device relating to the invention that the ionization chamber includes at least two separate electrodes, namely a first electrode, or reference electrode, and a second electrode, or the electrode measuring the size and shape of the field, that the first electrode is located mainly in the centre part of the radiation field being measured, and the second electrode is located so that the edge of the radiation area can be set to pass through this electrode, that the device includes a measuring part which determines the shape of the field by comparing the current of the first electrode with the current of the second electrode.

The ionization chamber relating to the invention differs from a conventional ionization chamber in that the conductive area, corresponding to an electrode gathering positive ions in a conventional ionization chamber, is divided into separate parts. The ionic current gathered from these areas, that is, from the different electrodes, gives information on the ionization of the air or gas space corresponding to these areas, and thus at the same time on the radiation energy passing through the said areas.

The ratio of the currents of the electrodes in the ionization chamber describes the size of the field more or less linearly. When aiming at greater accuracy, however, it is advantageous to calibrate the ratio with a sufficient number of different values of the radiation field. The calibration data obtained is stored in the apparatus' memory, for example, as a "spline"-type approximation curve, the parameters of which are calculated automatically in connection with calibration.

The ratios between different electrode currents can also be influenced by changing the shape of the electrodes. Their field dependencies can be made as linear as possible or appropriately non-linear. Similarly, it is advantageous to use that part of the measuring chamber, of which the corresponding electrode area is not used for determining the size of the field, to measure the ionization current, especially at low radiation values. The "protective" electrodes of these areas at the same time improve the linearity of the peripheral areas of the electric fields formed by polarization voltages.

The invention is described with examples in the following, with reference to the appended drawings in which FIG. 1 shows diagrammatically an X-raying situation where the radiation dose the patient is subjected to is measured by means of an ionization chamber.

Figure 2:
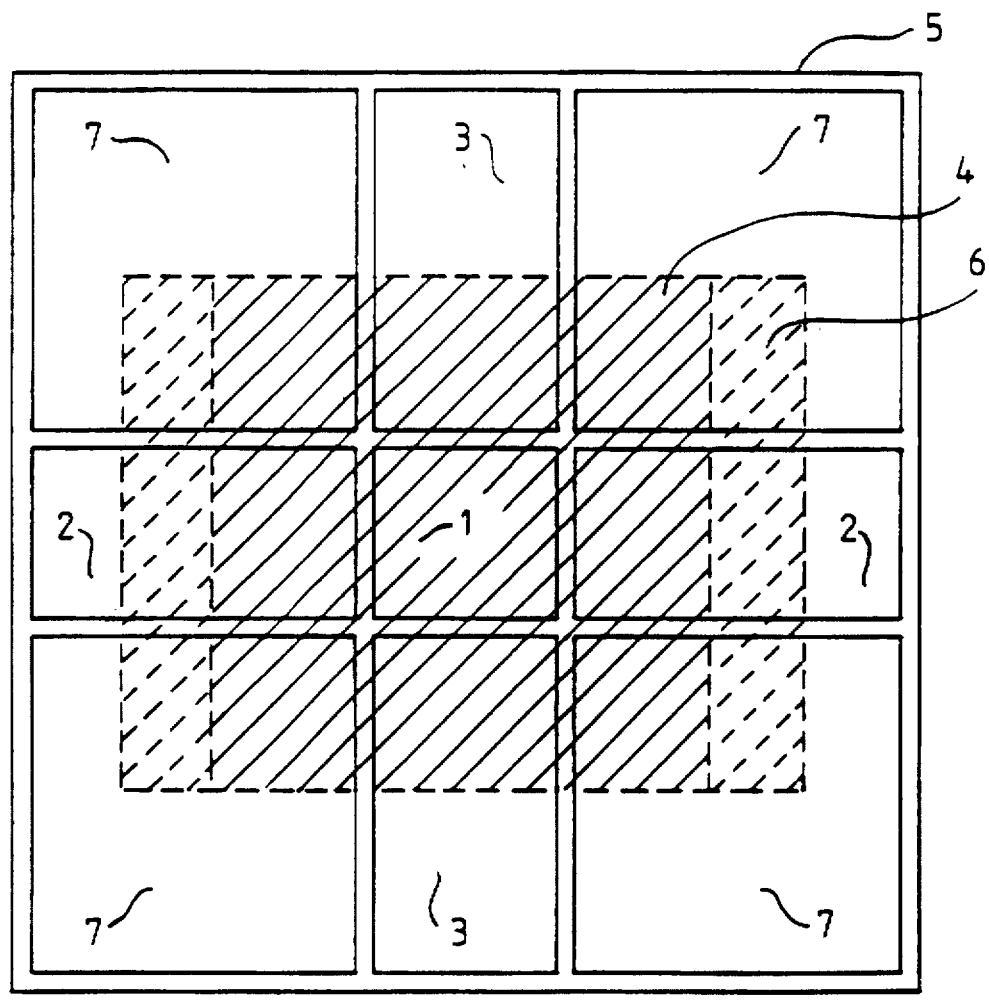
FIG. 2 shows the electrodes in an ionization chamber according to one embodiment of the invention, as seen from above.
Figure 4:
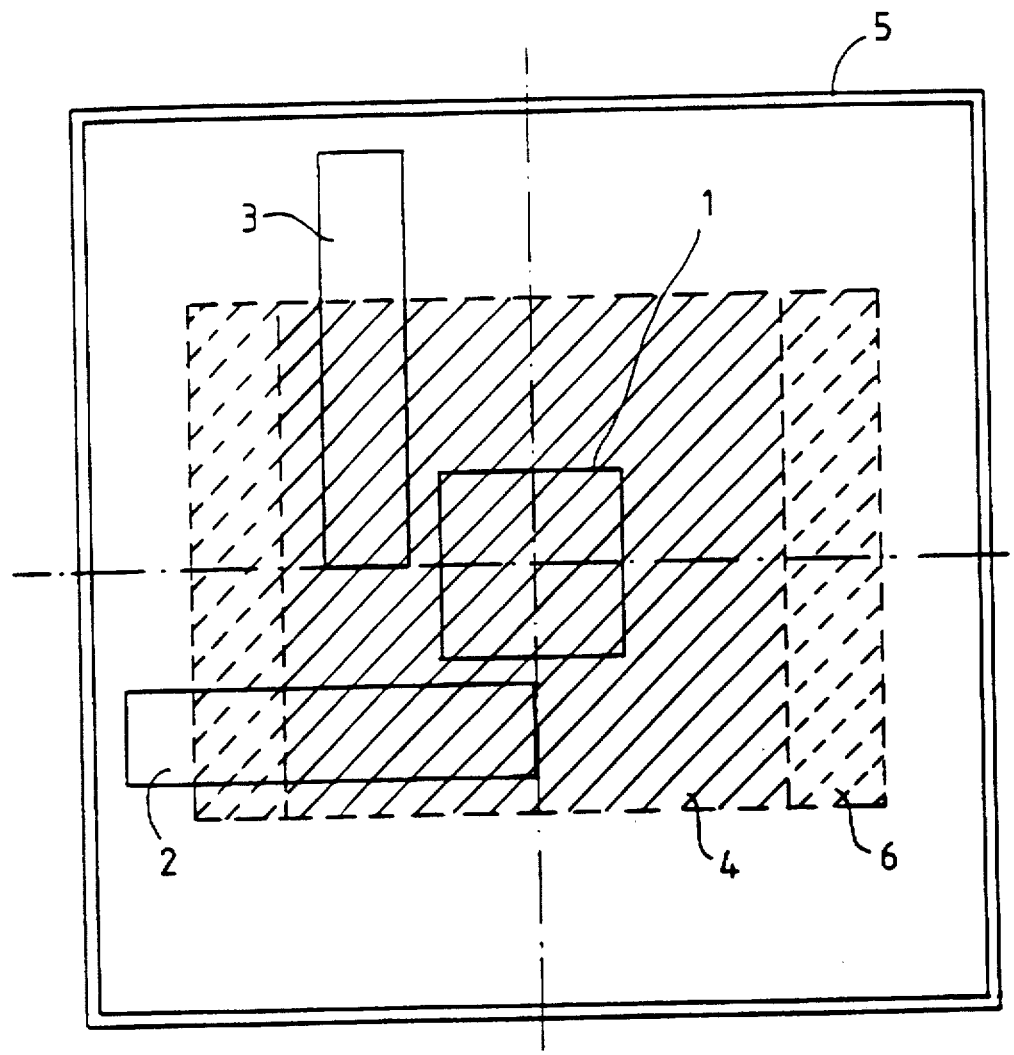

FIG. 4 corresponds to FIG. 2 and shows the electrodes in an ionization chamber according to a second embodiment.

Figure 5:
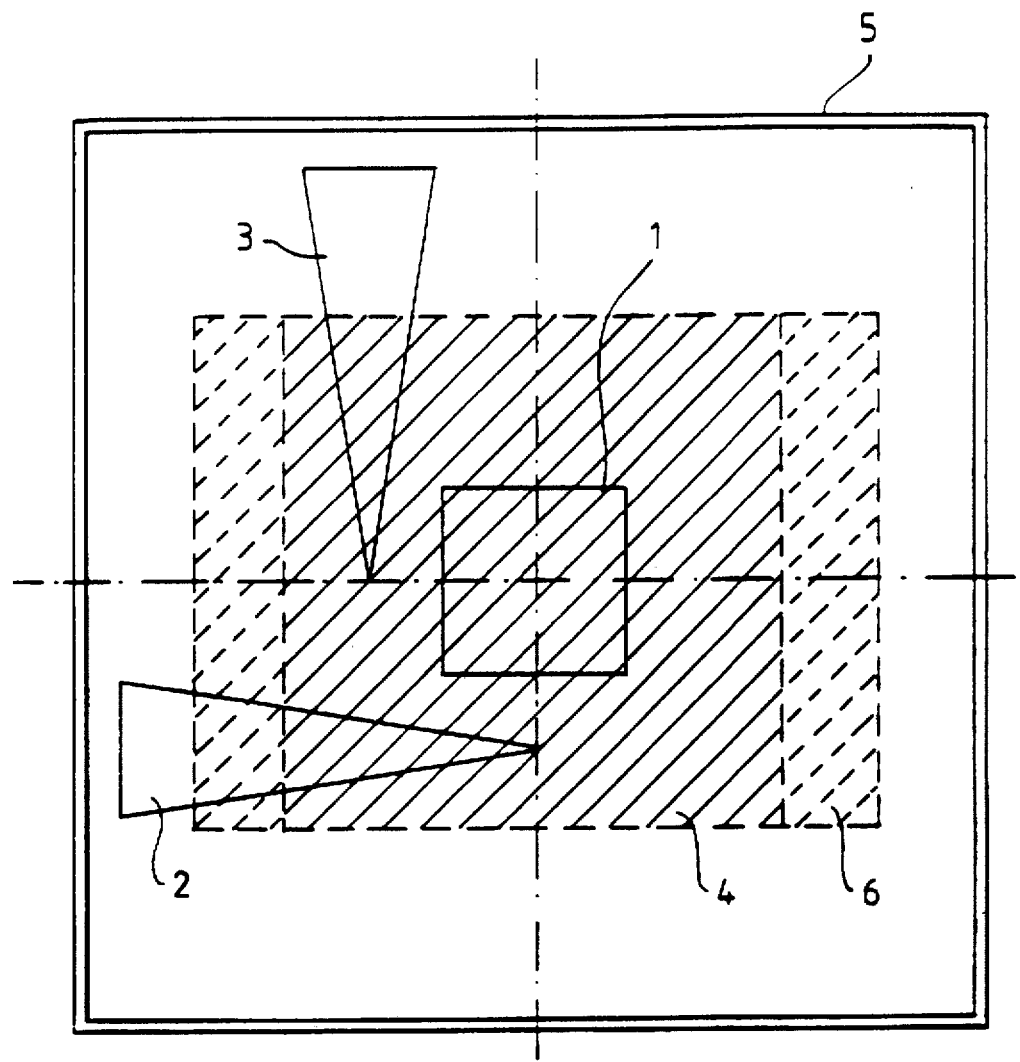

FIG. 5 corresponds to FIG. 2 and shows the electrodes in an ionization chamber according to a third embodiment.

Figure 1:
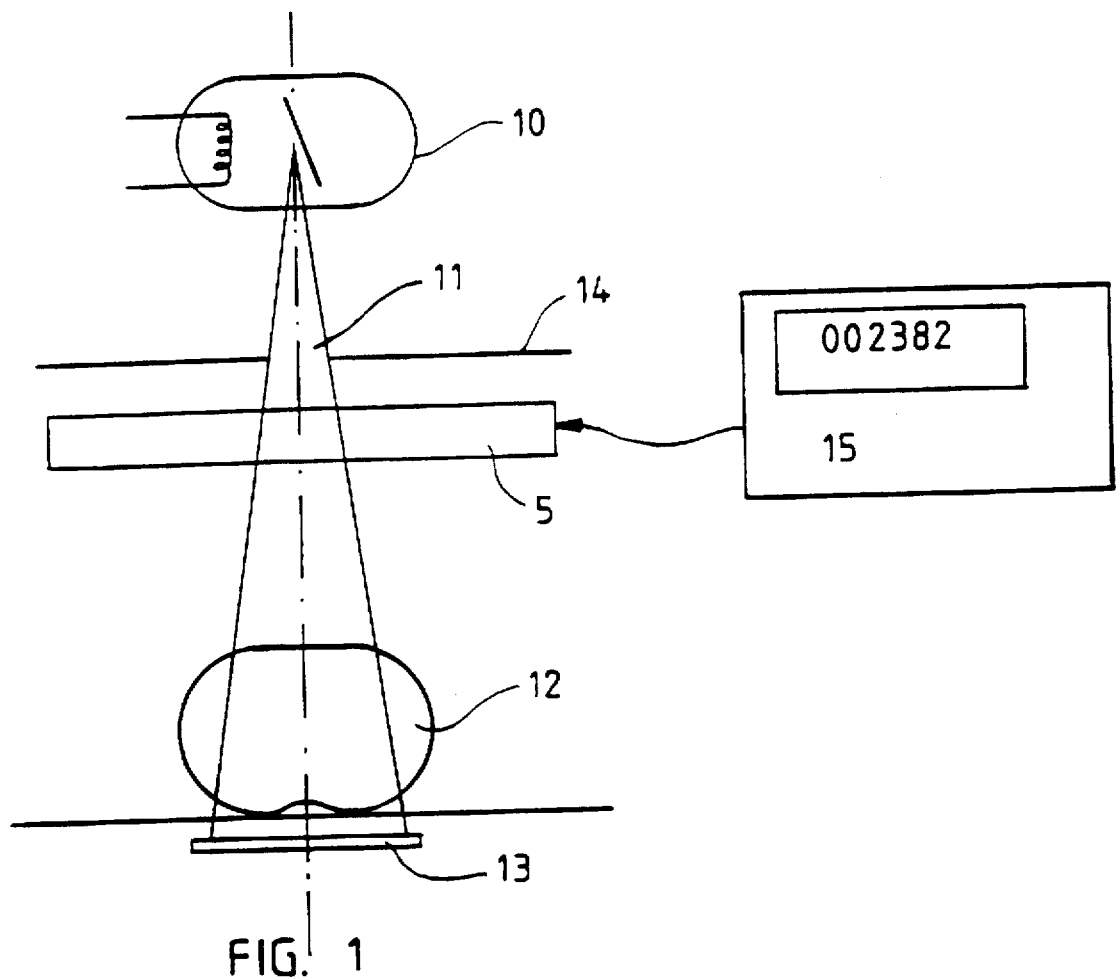

FIG. 1 shows diagrammatically an X-raying situation where the radiation dose the object being X-rayed, that is, the patient, is subjected to is measured by means of an ionization chamber 5. The X-raying equipment in FIG. 1 includes an X-ray tube 10, the radiation 11 transmitted from which is limited by screens 14. The radiation passes through the chamber 5, a part of the radiation 11 being absorbed by the chamber 5.

The ions formed by the radiation absorbed by chamber 5 pass to different electrodes due to the effect of the polarization voltage. The currents obtained from the electrodes are integrated during the radiation period in the measuring part 15 to give readings which are proportional to the radiation that penetrated the area corresponding to a part of the electrode of the chamber 5. The radiation passes further through the object 12 being X-rayed to the picture receptor 13.

FIG. 2 shows the electrodes in an ionization chamber 5 according to one embodiment of the invention, as seen from above. In the centre of the chamber 5 is a reference electrode 1 which is presumed to be subjected to the total amount of radiation. In FIG. 2, the ratio of the current of electrode 2, measuring in the horizontal direction, or x-direction, to the current of the reference electrode 1, is proportional to the size of the radiation field in the x-direction. Similarly, in FIG. 2, the ratio of the current of electrode 3, measuring in the vertical direction, or y-direction, to the current of the reference electrode 1, is proportional to the size of the radiation field in the y-direction.

The smaller radiation area 4 and radiation area 6—which is wider in the x-direction—shown in FIG. 2 illustrate typical forms of radiation fields limited with screens 14. When it is presumed that radiation is distributed evenly in these areas, the current of electrode 3 is found to be the same with both radiation field forms 4 and 6. The current of electrode 2, on the other hand, increases in linear proportion to the width of the radiation field in x-direction, when moving from the smaller radiation field form 4 to the larger form 6.

It is found that the ratio of the current of electrode 2 to the current of the reference electrode 1, and the ratio of the current of electrode 3 to the current of the reference electrode 1, are independent of the magnitude of the radiation. They only change according to the size of the radiation field.

In the corners of the ionization chamber 5 of FIG. 2 are also located "protective" electrodes 7, known as such. The current obtained from them can be added to the current readings of the other electrodes, in which case the sum of currents obtained will correspond to the current reading given by a conventional chamber, that is, a chamber equipped with a single, integrated electrode.

Figure 3:
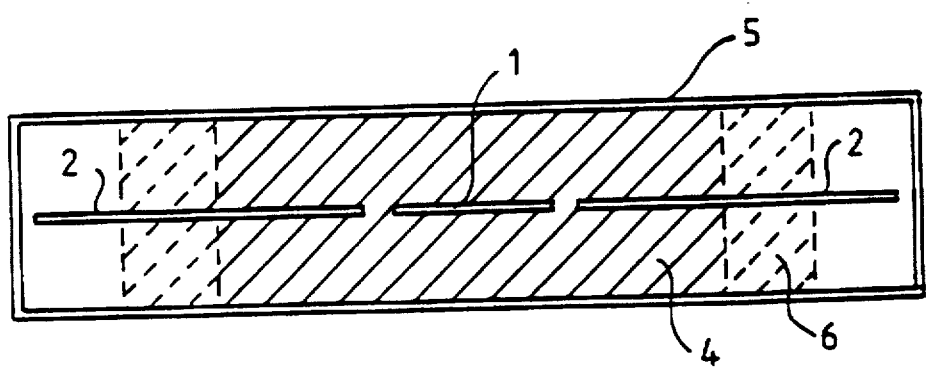
FIG. 3 shows an ionization chamber relating to the invention as seen from the side, as a vertical section along line III—III in FIG. 2.

FIG. 3 shows an ionization chamber 5 relating to the invention as seen from the side, as a vertical section of FIG. 2. Inside the chamber 5, in the centre of it, is the reference electrode 1, and on both sides of it in the figure the electrodes 2 which measure horizontally, that is, in the x-direction. Reference number 4 designates the smaller radiation area shown already in FIG. 2, and reference number 6 refers to the wider radiation area.

FIG. 4 shows a second embodiment of the ionization chamber 5, with only one electrode 2 measuring in the x-direction and only one electrode 3 measuring in the y-direction. One end of each electrode 2 and 3 is on the symmetry axis. Due to the structure, the ratio of the current of the electrode 2 measuring in the x-direction to the current of the reference electrode 1 Is directly proportional to the size of the rectangular radiation beam in the x-direction. Similarly, the ratio of the current of the electrode 3 measuring in the y-direction to the current of the reference electrode 1 is directly proportional to the size of the rectangular radiation beam in the y-direction.

FIG. 5 shows a third embodiment of the ionization chamber 5 also with only one electrode 2 measuring in the x-direction and only one electrode 3 measuring in the y-direction. In this example, the electrodes have been shaped into wedge form. If necessary, any other shapes can also be used, when one electrode Is to directly indicate, for example, the surface area.

It is obvious to a person skilled in the art that the invention is not limited to the embodiments presented in the description and claims, but can be modified within the scope of the claims. Thus the invention can also be utilized in other connections than with X-ray sources.

We claim:

1. A method for determining the size and shape of the field of a radiation beam of an ionizing radiation source by means of an ionization chamber comprising the steps of:

dividing the field to be measured into at least two electrode areas, a first reference electrode area located centrally in the radiation field being measured, and at least one secondary electrode area, setting the edge of the radiation area so as to pass through said at least one secondary electrode area, and determining the size and shape of the field by comparing the current of the first reference electrode area with the current of said at least one secondary electrode area.

2. A method as claimed in claim 1 characterized in that:

the ratio of the current of the first electrode area and the current of the at least one secondary electrode area is measured with field shapes of different magnitudes from previously known measurements, and the data obtained is stored in the apparatus memory, the parameters of which are calculated automatically in connection with the calibration.

3. A device for determining the size and shape of the field of a radiation beam (11) of an ionizing radiation source (10) by means of an ionization chamber (5), characterized in that the ionization chamber (5) includes at least two separate electrodes (1, 2, 3), namely a first electrode, or reference electrode (1), and a second electrode, or the electrode (2, 3) measuring the size and shape of the field, that the first electrode (1) is located mainly in the centre part of the radiation field being measured, and the second electrode (2, 3) is located so that the edge of the radiation area can be set to pass through this electrode, that the device includes a measuring part (15) which determines the shape of the field by comparing the current of the first electrode (1) with the current of the second electrode (2, 3).

4. A device as claimed in claim 3, characterized in that the reference electrode (1) is located in the centre of the ionization chamber (5), and the electrodes (2, 3) measuring the shape or the field on either side of it.

5. A device as claimed in claim 3 or 4, characterized in that in the ionization chamber (5), the reference electrode (1) is in the centre and four electrodes (2, 3) measuring the size and shape of the field are on different sides of it.

6. A device as claimed in claim 3 or 4, characterized in that four separate protective electrodes (7) are located in the corners of the ionization chamber (5).

7. A device as claimed in any of claim 3 to 4, characterized in that in addition to the reference electrode (1) and the electrodes (2, 3) measuring the shape and size of the radiation field, the remaining electrode area acts as a separate protective electrode (7).

8. A device as claimed in claim 3, characterized in that the reference electrode (1) is located in the centre of the ionization chamber (5), and the electrode (2, 3) measuring the size and shape of the field is located basically between the symmetry axis and edge of the ionization chamber.

9. A device as claimed in claim 8, characterized in that in the ionization chamber (5) there are two electrodes (2, 3) located perpendicular to each other which measure the shape of the field.

10. A device as claimed in claim 8 or 9, characterized in that the width of the electrode (2, 3) measuring the size and shape of the field changes from the centre of the ionization chamber (5) towards its edges.

* * * * *